Figure 1:
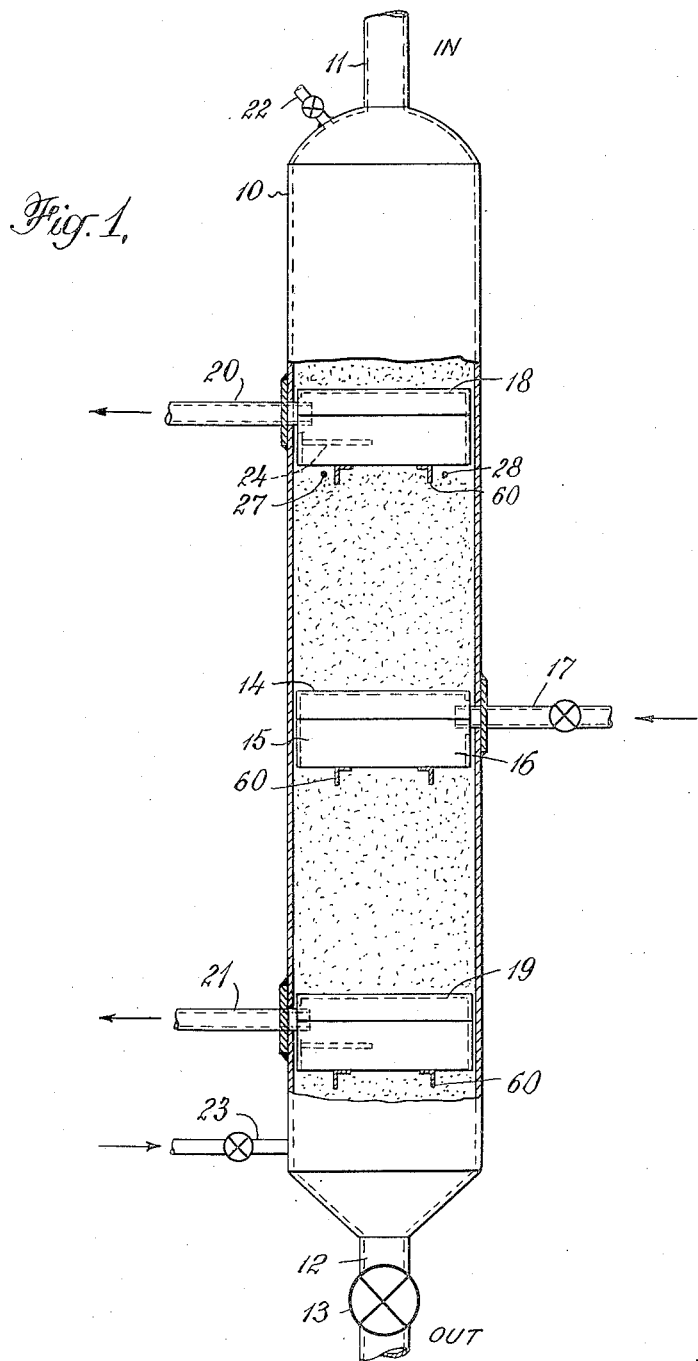

Jan. 3, 1950 G. S. DUNHAM 2,493,235
APPARATUS FOR GAS-SOLID CONTACTING
Filed Nov. 21, 1945 2 Sheets-Sheet 1

INVENTOR
GEORGE S. DUNHAM
BY
John A. Crowley Jr.
AGENT OR ATTORNEY

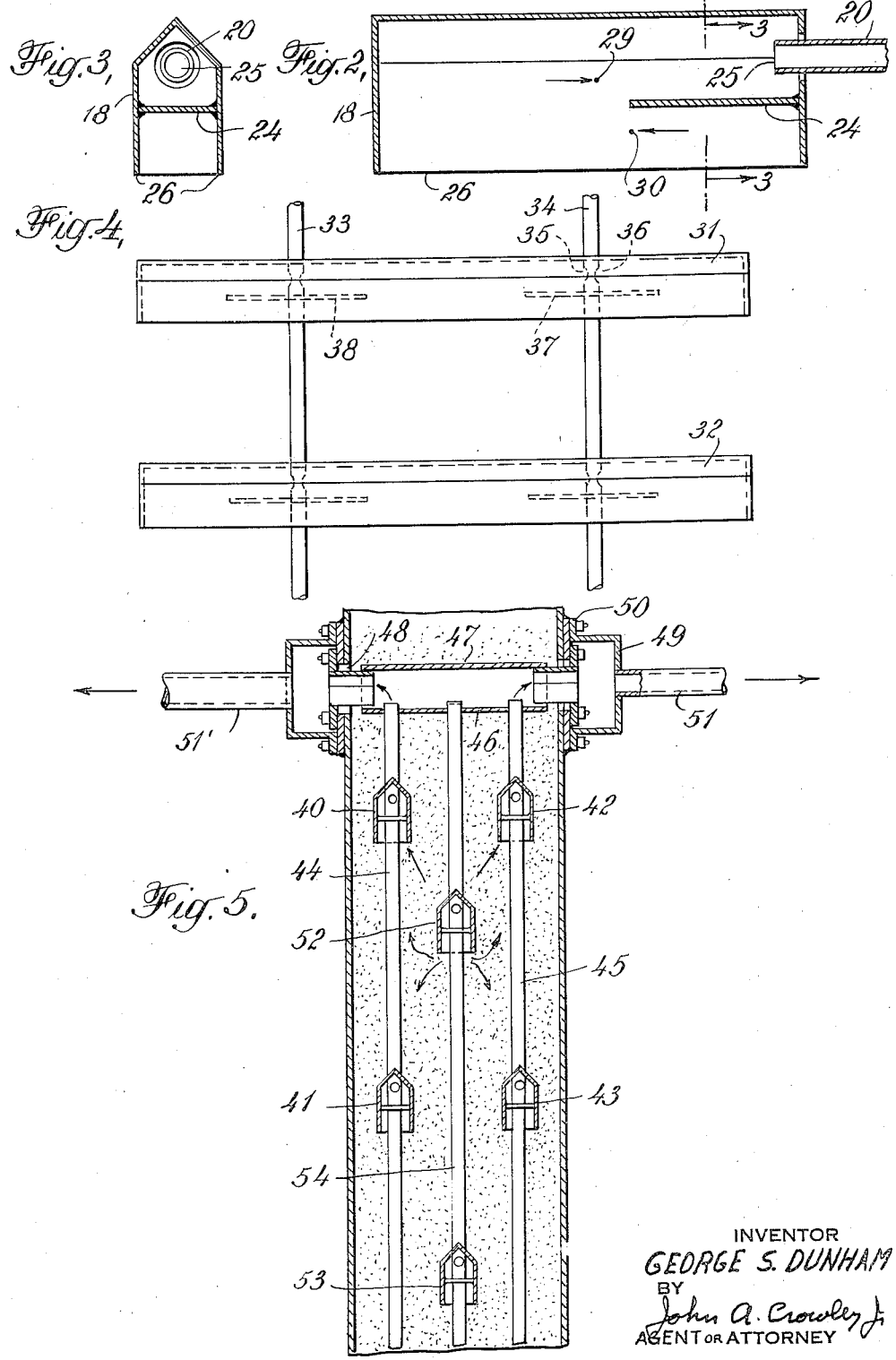

Patented Jan. 3, 1950

2,493,235

UNITED STATES PATENT OFFICE 2,493,235

APPARATUS FOR GAS-SOLID CONTACTING

George S. Dunham, Plainfield, N. J., assignor to Socony-Vacuum Oil Company, Incorporated, a corporation of New York Application November 21, 1945, Serial No. 630,099

8 Claims. (Cl. 23—288)

This invention pertains to apparatus for gas-solid contacting, and deals particularly with the construction of apparatus for distribution of gaseous materials into compact masses of particle form solids and for separation of gaseous materials therefrom. The apparatus may be used for a number of processes, for example, catalytic conversion of hydrocarbons, catalyst regeneration, drying of solids or gases, gas-adsorption or desorption, gas purification, and gas-solid heat exchange. A typical process is the catalytic conversion of hydrocarbons, it being well known, for example, that petroleum gas oils boiling within the range about 450° F. to 750° F. when contacted with certain particle form solid adsorbent materials at temperatures above about 800° F. and usually at super-atmospheric pressures may be converted to gasoline and other lower boiling products. Such conversion processes may take the form of one in which particle form solid contact material is passed cyclically through a conversion zone wherein it is contacted with hydrocarbons to effect the conversion thereof and through a regeneration zone wherein it is contacted with a combustion supporting gas acting to burn from the contact material the carbonaceous contaminant deposited thereon during the hydrocarbon conversion. The contact material may take the form of natural or treated clays, bauxites, alumina or synthetic associations of silica, alumina, silica and alumina to which small amounts of other materials such as metallic oxides may be added. The size of the particles of contact material may fall within the range of about 4 to 100 mesh and preferably within the range of 4 to 8 mesh as measured by Standard Tyler Screen analyses.

In all of such gas-solid contact processes a problem of major importance is the uniform distribution of gaseous inlet material over the entire cross-section of the contact material column or bed. An equally important and even more difficult problem is the withdrawal of gaseous outlet material from the column of contact material in the contacting zone without substantial entrainment of the contact material particles.

A major object of this invention is the provision in a gas-solid contacting apparatus of an improved means for distributing inlet gas into and for separating outlet gas from a compact bed or column of particle-form contact material.

An important object of this invention is the provision in a gas-solid contacting vessel of apparatus for withdrawal of contacted gas from said vessel without substantial entrainment of contact material particles.

Another object of this invention is the provision in a catalyst regeneration vessel through which the catalyst passes as a substantially compact column of particle form solids, of apparatus for withdrawal of regeneration gas from the column of contact material without substantial entrainment of solid particles.

These and other objects of this invention will become apparent from the following description of the drawings attached hereto. Of these drawings, Figure 1 is an elevational view, partially in section, of a gas-solid contacting vessel provided with the new improved gas handling members; Figure 2 is a detailed longitudinal view, in section, of one of the gas handling members shown in Figure 1; Figure 3 is a sectional view taken at line 3—3 in Figure 2; Figure 4 is an elevational view, partially in section, of a modified form of gas handling apparatus and Figure 5 shows a typical arrangement of the apparatus shown in Figure 4 in a section of a gas-solid contacting vessel. All of the drawings are highly diagrammatic in form.

Turning to Figure 1, we find 10 is a gas-solid contacting vessel such as may be used for petroleum hydrocarbon conversion or for gas-solid heat exchange or for other gas-solid contacting processes. The vessel 10 is provided on its upper end with a solid inlet conduit 11 and on its lower end with a solid outlet conduit 12 bearing a flow control valve 13. Extending horizontally across the intermediate section of the vessel is a row of inverted, gable-roofed troughs spaced horizontally apart to permit flow of contact material therebetween. In the sectional view shown in Figure 1 only one of said troughs, 14, may be seen. The troughs are supported by means of angles 60, which extend from wall to wall of the vessel under the troughs. Closure plates 15 and 16 are provided on the ends of each trough and a gas inlet duct 17 extends a short distance under one end of each trough at a level near the roof thereof. Similar rows of troughs are provided across the upper and lower sections of the vessel. One trough in the upper row 18, and one on the lower row 19, may be seen in Figure 1.

Gas outlet ducts 20 and 21 extend a short distance under one end of the troughs 18 and 19 respectively. An inlet 22 is provided at the upper end of vessel 10 for admittance of an inert seal gas to prevent escape of contacting gas through the solid inlet conduit 11. An inlet 23 for inert purge and seal gas is provided near the bottom of vessel 10 to prevent substantial escape of contacting gas through the solid outlet conduit 12.

In operation particle form contact mass material passes through the vessel 10 as a substantially compact column of downwardly moving particles. The rate of solid flow is controlled by means of valve 13 on the outlet conduit 12. Contacting gas is introduced through the row of inlet ducts 17 under the row of gas distributing troughs 14. The gas passes out from under the open bottoms of the troughs 14 in part upwardly and in part downwardly through the column of contact material. Contacted gas is collected under troughs 18 and 19 and is withdrawn therefrom through the openings in the ends of outlet ducts 20 and 21 respectively.

Studying now the detailed views of a collector trough shown in Figures 2 and 3 in conjunction with Figure 1, there is provided a partition 24 extending across the width of the trough at a level below the opening 25 in outlet duct 20 and substantially above the lower edges 26 of the trough. The partition 24 extends longitudinally from that end of the trough under which the outlet duct is located a substantial distance along the length of the trough. In general the partition should preferably extend about half the length of the collector trough and not less than about one-third the length thereof. In this manner the linear gas velocity in the direction of the arrows in Figure 2 at points 29 and 30 may be and should be maintained approximately equal. It has been found that in the absence of the partitions 24 the rate of gas flow at those areas of gas-solid disengagement existing under the collector trough nearest the location of the outlet duct is substantially greater than it is at locations more remote from the outlet duct location. For example, the rate of gas flow at point 27 in Figure 1 may be higher than at point 28. Moreover, it is apparent that the linear rate of gas flow, longitudinally under the collector troughs in the direction of the outlet ducts, is approached. Due to these tendencies, in the absence of partition 24, a substantial amount of solid particle entrainment in the effluent gas occurs. The provision of the partition has been found to substantially prevent such solid entrainment and to provide for a more uniform rate of gas withdrawal from all sections of the column cross-section. A similar partition or partitions may be provided under each gas inlet trough near the inlet duct end thereof, and if provided will permit more uniform distribution of inlet gas to all sections of the column cross-sectional area.

It will be understood that the drawings are merely diagrammatic in form and are not intended as limiting the invention to the exact structural details shown therein. The distributing troughs may take any of a number of cross-sectional shapes, for example, angular, or rectangular but troughs having tapered roofs are preferred. Furthermore, the number of rows of troughs, the vertical spacing thereof and the means for withdrawing gas from under the troughs may be other than that shown in Figure 1.

For example, in Figure 4 there is shown a somewhat modified gas collecting assembly particularly well adapted for gas-solid contacting operations wherein high total gas throughput rates are encountered. An exemplary operation is catalyst regeneration. In Figure 4 is shown a portion of a vertical row of spaced gas collecting troughs, two troughs 31 and 32 being shown. Associated with said troughs is a row of vertically extending tubes 33 and 34 spaced at uniform horizontal distances apart and arranged so that each tube passes through the roof of each trough perpendicularly to the length of said troughs. Preferably the roofs of the troughs are welded to the tubes and in any event the fit between trough and tube roof should be tight. Openings 35 and 36 are provided on either side of each tube at a location underneath and near the roof of each trough. Partitions such as 37 and 38 extend across the width of the troughs and longitudinally along at least one-third of the total trough length immediately on either side of each tube. Since the tubes are arranged at uniform intervals along the length of each trough, the partitions extend substantially equal distances on either side of each tube. A typical installation of such a gas collecting assembly is shown in Figure 5 wherein 39 represents a vertical section of part of a gas-solid contacting vessel. Within the vessel are shown two vertical rows of gas collecting troughs of which two troughs in each row are shown 40, 41 and 42, 43. Rows of vertical tubes of which one in each row 44 and 45 are shown, extend upwardly through the collecting troughs and terminate under a row of gable-roofed outlet manifold troughs extending horizontally across the vessel in a direction at right angles with the collector troughs. An inverted angle iron 46 is attached longitudinally along the lower edges of each outlet manifold trough 47 so as to provide a floor for each of said troughs. The collector tubes extend through the angle iron floors and derive lateral support therefrom. Sleeves 48, flanged to the vessel shell and having roughly the same cross-sectional shape as the outlet manifold troughs 47 extend a short distance under each end of each manifold trough to provide support and to provide a passage for gas flow from under the outlet manifold troughs to the outlet manifold boxes 49 fixed by flanges 50 along opposite sides of the vessel shell at the level of the outlet manifold troughs. Outlet conduits 51 and 51' are provided for gas withdrawal from the manifold boxes. Also within the vessel 39 is a vertical row of distributor troughs of which two troughs 52 and 53 are shown. A row of vertical distributing tubes (one 54 being shown) extend upwardly through the collector troughs and terminate with closed ends under the outlet manifold troughs 47. A trough and sleeve arrangement similar to that shown for the outlet manifold troughs 47 may be provided at the lower ends of tubes for admission of gas to the distributor tubes and for support of all the tubes. The collector tubes are closed on their lower ends to prevent bypass of inlet gas therethrough. The direction of gas flow within the vessel is substantially as shown by the arrows in Figure 5. It will be apparent that the spacing of distributor and collector troughs the number of such troughs in any single vertical row and the spacing of distributing and collecting tubes will vary widely depending upon the particular materials and operating conditions for which the apparatus is to be employed. It will also be apparent that the arrangement shown in Figure 5 may be considered as a portion of one stage of a vessel which may contain several of such stages arranged one above the other.

It should be understood that the details of construction and operation described hereinabove are exemplary in character and are in no way intended as limiting the scope of this invention except as it may be limited by the following claims.

I claim:

1. In a gas-solid contacting apparatus, a gas handling member in the form of an inverted trough, a duct for gas flow associated with said gas handling member, said duct having at least one opening therein communicating the interior of said duct with the underside of said gas handling member at at least one location along the length thereof, a partition disposed inside of said trough mounted longitudinally of said trough and extending widthwise between the sides of said trough only below the location of said opening in said duct under said trough and substantially above the lower edges of said trough, said partition extending longitudinally only along a substantial portion of the length of said trough which is immediately adjacent the location of said opening in said duct thereby providing inside of said trough an upper passage adjacent the location of said opening having said partition as its bottom and a lower passage open along its bottom and having said partition as its roof.

2. In a gas-solid contacting apparatus a confined upright chamber, a gas handling member in the form of an inverted trough disposed within said chamber and transversely of said chamber, a duct extending inside of said trough, an opening in said duct communicating its interior with the space inside of said trough at a level substantially above the lower edges of the trough, a partition disposed inside of and substantially longitudinally of said trough, said partition extending widthwise between the sides of said trough only below the level of said duct opening and substantially above the lower edges of said trough and extending lengthwise longitudinally along a portion of the trough length which is immediately adjacent said duct opening, the longitudinal dimension of said partition being at least one third of the total length of said trough but substantially less than the entire length of the trough.

3. In a gas-solid contacting apparatus an inverted, horizontally extending gas collecting trough, a gas outlet duct opening at a location underneath and near the roof of said trough, a substantially horizontal partition underneath said trough extending longitudinally along at least a third of the total length but less than the entire length of said trough from which said duct draws gas, said partition being so located as to provide underneath said trough a confined upper passage communicating said duct opening with the partition free portion of said trough and a separate lower passage, open along its bottom and communicating with said upper passage at the partition free portion of said trough.

4. In a gas-solid contacting vessel, a horizontally extending inverted gas collecting trough, a gas outlet duct, open on its end extending a short distance under one end of said trough substantially above the lower edges thereof, and a partition extending across the width of said trough at a level only below said duct and substantially above the lower edges of said trough, said partition extending longitudinally from that end of said trough under which said duct extends for a distance equal to at least one-third the total length of said trough but less than the entire length of said trough.

5. In a gas-solid contacting vessel, a horizontally extending inverted gas collecting trough, open along its bottom a substantially vertically positioned gas outlet tube passing through the roof of said trough and fitted snugly thereto, said tube having an opening in its side at a location underneath and near the roof of said trough, a partition supported across the width of said trough at a level therein only below the opening in said tube and substantially above the lower edges of said trough, said partition fitting snugly around said tube and extending longitudinally less than the entire trough length but along a substantial portion of the trough length immediately adjacent and on either side of said tube so as to prevent direct flow of gas from under the edges of that portion of the trough immediately adjacent said tube to said opening in said tube.

6. In a gas-solid contacting vessel, a plurality of horizontally extending spaced apart inverted gas collecting troughs arranged in a vertical row, a plurality of spaced apart vertically extending gas collector tubes arranged in a horizontal row so that each tube passes tightly through the roof of each of said plurality of troughs, each of said tubes having at least one opening therein at a location underneath each of said troughs to permit gas flow from a portion of the length of each trough into each tube, a plurality of spaced, substantially horizontal partitions disposed inside of each trough mounted between the sides thereof at a level below the openings in said tubes and above the lower edges of the trough, each one of said partitions fitting snugly around one of said tubes and extending longitudinally of said trough a substantial distance either side of the tube but terminating short of the partitions around the adjacent tubes.

7. In a gas-solid contacting vessel, a plurality of vertically spaced horizontally extending gable-roofed, inverted gas collecting troughs arranged in a vertical row, closure plates at the ends of each trough, a plurality of vertically extending gas collecting tubes, spaced horizontally apart at uniform distances and arranged in a horizontal row so that each of said tubes passes through the roof of each of said troughs, each of said tubes having at least one opening in its side at a location underneath each of said troughs to provide for gas flow from a proportionate portion of the length of each trough to each tube, below the roof of each trough at a level below that of said openings in said tubes and substantially above the lower edges of said trough a plurality of substantially horizontal partitions positioned across the width of each trough between its sides and spaced at intervals along the length of said trough so that each partition extends longitudinally of said trough substantially equal distances on either side of one of said tubes, the total length of each partition being equal to at least about one third the distance between adjacent tubes.

8. In a gas-solid contacting vessel at least one horizontally extending inverted gas-collecting trough having a gable-roof and closed ends, a gas outlet duct, open on its end, extending a short distance under one end of said trough substantially above the lower edges thereof, and a partition extending across the width of said trough between its sides at a level only below said duct and substantially above the lower edges of said trough, said partition extending longitudinally from that end of said trough under which said duct extends for a distance equal to at least one-third the total length of said trough but terminating substantially short of the opposite end of said trough.

GEORGE S. DUNHAM.

REFERENCES CITED

The following references are of record in the file of this patent:

UNITED STATES PATENTS

| Number | Name | Date |
|---|---|---|
| 2,350,644 | Simpson et al. | June 6, 1944 |